UNITED STATES PATENT OFFICE.

PHILIPPE AUGUSTE GUYE, OF GENEVA, SWITZERLAND, ASSIGNOR TO FERDINAND GROS & BOUCHARDY, OF PARIS, FRANCE, A FIRM.

MANUFACTURE OF NITRIC ANHYDRID.

1,348,874.

Specification of Letters Patent.

Patented Aug. 10, 1920.

No Drawing.

Application filed May 9, 1918. Serial No. 233,568.

*To all whom it may concern:*

Be it known that I, PHILIPPE AUGUSTE GUYE, a citizen of the Swiss Republic, residing in Geneva, Switzerland, have invented a certain new and useful Improved Manufacture of Nitric Anhydrid, of which the following is a specification.

It is known that nitric anhydrid ($N_2O_5$) can be made by causing ozone to react with nitrogen peroxid ($N_2O_4$) or with nitric oxid (NO) or with nitrogen trioxid ($N_2O_3$), all of which yield nitric anhydrid in contact with ozone. These reactions are interesting, particularly the first, since they consume the minimum of oxygen. It has been found that the change occurs according to the equation

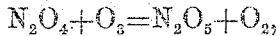

two-thirds of the oxygen of the ozone being liberated.

Ozone cannot be obtained industrially save in a diluted condition in air or oxygen and with the best industrial apparatus operated by silent electric discharges, the concentration of the ozone is of the order of 10 grams per cubic meter in air or 20-30 grams per cubic meter in pure oxygen. This condition appears at first opposed to the industrial utilization of the reaction

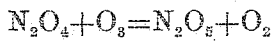

for producing $N_2O_5$ by causing ozonized oxygen to bubble into cooled nitrogen peroxid, because there would be much of the latter carried forward since it has nearly the same vapor tension as $N_2O_5$; at atmospheric pressure $N_2O_4$ boils at 21.5° C. and $N_2O_5$ sublimes at 31.5° C, whence it follows that it is very difficult to separate afterward the two bodies $N_2O_4$ and $N_2O_5$ carried forward by the excess of oxygen which has traversed the liquid nitrogen peroxid. It is for this reason that Helbig has recommended simply passing a current of ozonized oxygen over solid $N_2O_4$ kept at —20° C. and condensing by cold the $N_2O_5$ carried forward.

By the present invention there are caused to react two currents of gas, one containing at least one oxid of nitrogen of a degree of oxidation lower than nitric anhydrid, $N_2O_5$, and higher than $N_2O$, the other containing ozone, the two currents being so proportioned to each other that there is excess neither of ozone nor of oxid of nitrogen; the nitric anhydrid, $N_2O_5$, which forms in the current of gases is separated at a temperature below —20° C. such as by direct cooling to —80° C. or by solution in a solvent cooled to at least —20° C. and indifferent to nitric anhydrid.

The reaction may be carried out with advantage in a chamber having an inlet and an outlet for the gases. One of the gaseous currents may consist of oxygen or air containing the oxid of nitrogen, for example nitrogen peroxid, $N_2O_4$, and the other may consist of ozonized oxygen or air. There may also be directed into the current of ozonized gas (oxygen or air) pure nitrous vapors, $N_2O_4$, in the state of gas, as well as the gases NO and $N_2O_3$.

For operating with $N_2O_4$ the following is an example of the procedure:—

The speed of the two currents is adjusted in such a manner that for each molecular proportion of $N_2O_4$ there is one molecular proportion of ozone, $O_3$; the two bodies react immediately at the ordinary temperature and thereafter the gaseous current contains only nitric anhydrid and the excess of oxygen.

The chief precaution to be observed is the very exact regulation, by means of the usual apparatus for controlling quantities of gas, of the relative volumes of the gases brought together.

The nitric anhydrid carried by the gaseous current (oxygen or air) is highly diluted; it is chilled to a temperature sufficiently low to condense practically the whole of this anhydrid.

The investigations preparatory to this invention showed that at —20° C. the vapor tension of $N_2O_5$ is about 7 mm. or nearly one hundredth of an atmosphere; but the $N_2O_5$ produced, being diluted in a large excess of gas (oxygen or air), the whole gaseous mass must be cooled to —80° C. to condense by cold nearly the whole (about 99 per cent.) of the $N_2O_5$ produced. The cost of the necessary refrigeration is diminished by using after the condensation of $N_2O_5$, in a suitable condensing apparatus, a heat interchanger in which the gas, freed from $N_2O_5$, cools the gas which contains $N_2O_5$ and is entering the condensing apparatus.

Another method of recovering the nitric anhydrid $N_2O_5$ consists in collecting it in liquid solvents which are indifferent to it; under these conditions the vapor tension of $N_2O_5$ in solvents less volatile than itself, is lowered and the condensation may be conducted at temperatures that are not so low as those necessary for recovering pure $N_2O_5$. Among such solvents pure nitric acid having substantially the composition represented by the formula $HNO_3$, pure sulfuric acid, $H_2SO_4$, and fuming sulfuric acid (mixtures of $H_2SO_4$ and $SO_3$) have been found to be particularly interesting from the industrial point of view.

Nitric acid ($HNO_3$) dissolves up to 30 per cent. of its weight of $N_2O_5$; it has then an oily consistence, recalling olive oil, and does not solidify until its temperature is below $-80°$ C.; the solidification curve indicates the presence of a compound having the formula $4HNO_3 + N_2O_5$.

Sulfuric acid ($H_2SO_4$) dissolves up to 52 per cent. of its weight of $N_2O_5$ and remains liquid above about $-50°$ C.; the curve of solidification of mixtures in various proportions discloses the existence of compounds $3N_2O_5.2H_2SO_4$ and $N_2O_5.4H_2SO_4$; the former, heated in a vacuum at $60°$ C. is transformed into the latter with disengagement of five-sixths of the dissolved $N_2O_5$.

When using fuming sulfuric acid as solvent for $N_2O_5$, there are obtained, according to the content in $SO_3$, various mixtures with $N_2O_5$, generally solidifying at low temperatures.

All these solutions may be used for preparing nitrated derivatives and may be substituted for the mixtures of sulfuric and nitric acids hitherto used for nitrations.

When the object is the obtaining of pure $N_2O_5$ there may be used advantageously as solvent a substance which does not form complexes with this anhydrid. To this category belongs, among others, carbon tetrachlorid (boiling point $76.8°$) from which the anhydrid $N_2O_5$ may be recovered by fractional distillation.

Whatever solvent is used the temperature for nearly complete condensation of the $N_2O_5$ is about $-60°$ C.; at $-20°$ C. the condensation is already of importance.

With any mode of recovering the $N_2O_5$ by cooled solvents it is advantageous to use heat interchangers in which the cooled gas, freed from $N_2O_5$ cools the gas containing $N_2O_5$.

Having now fully described the nature of my said invention and the best means I know of carrying the same into practical effect, I claim:—

1. A process for making continuously nitric anhydrid $N_2O_5$, by the reaction of ozone on an oxid of nitrogen of a degree of oxidation lower than $N_2O_5$ and higher than $N_2O$, wherein two gaseous currents, one containing at least one of the said oxids of nitrogen, the other containing ozone, are caused to react in such proportion to each other that there is present an excess neither of ozone nor of oxid of nitrogen, the nitric anhydrid which is formed being recovered from the gaseous current at a temperature below $-20°$ C.

2. A process according to claim 1, wherein the nitric anhydrid is separated from the gaseous current by solution in a solvent which is cooled to at least $-20°$ C. and is without substantial effect on the chemical properties of the anhydrid.

3. A process according to claim 1, wherein the nitric anhydrid is separated from the gaseous current by solution in concentrated nitric acid, $HNO_3$, which is cooled to at least $-20°$ C.

4. A process according to claim 1, wherein the chilled gases issuing from the recovery apparatus pass through a heat interchanger where they cool gases charged with $N_2O_5$ entering the recovery apparatus.

In testimony whereof I have signed my name to this specification in the presence of two subscribing witnesses.

PHILIPPE AUGUSTE GUYE.

Witnesses:
 LOUIS H. MUNICY,
 J. DIVORNE.